G. Aldrich.

Ladder.

N° 1,166.
32,170.

Patented Apr. 30, 1861.

Witnesses.
H. O. Smith
N. A. Lewis

Inventor.
George Aldrich.

UNITED STATES PATENT OFFICE.

GEORGE ALDRICH, OF ARMADA TOWNSHIP, MACOMB COUNTY, MICHIGAN.

LADDER.

Specification of Letters Patent No. 32,170, dated April 30, 1861.

*To all whom it may concern:*

Be it known that I, GEORGE ALDRICH, of the township of Armada, in the county of Macomb and the State of Michigan, have invented a new and useful Improvement in Ladders which are Designed to be Used in Picking Fruit or for other Purposes; and I do hereby declare the following to be a clear and exact description of the construction and operation of the same, reference being had to the accompanying drawings, making a part of the specification, in which—

Figure 2:
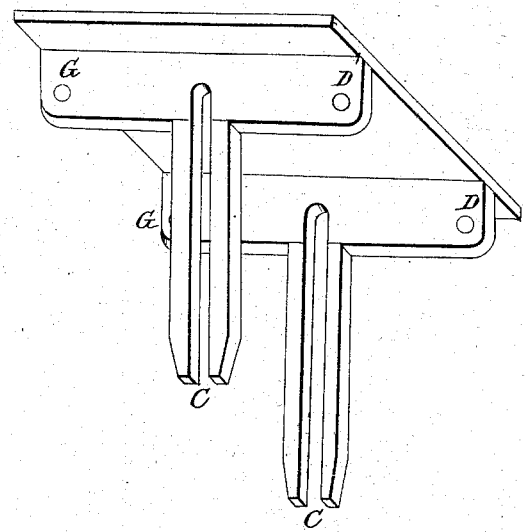
Figure 1:
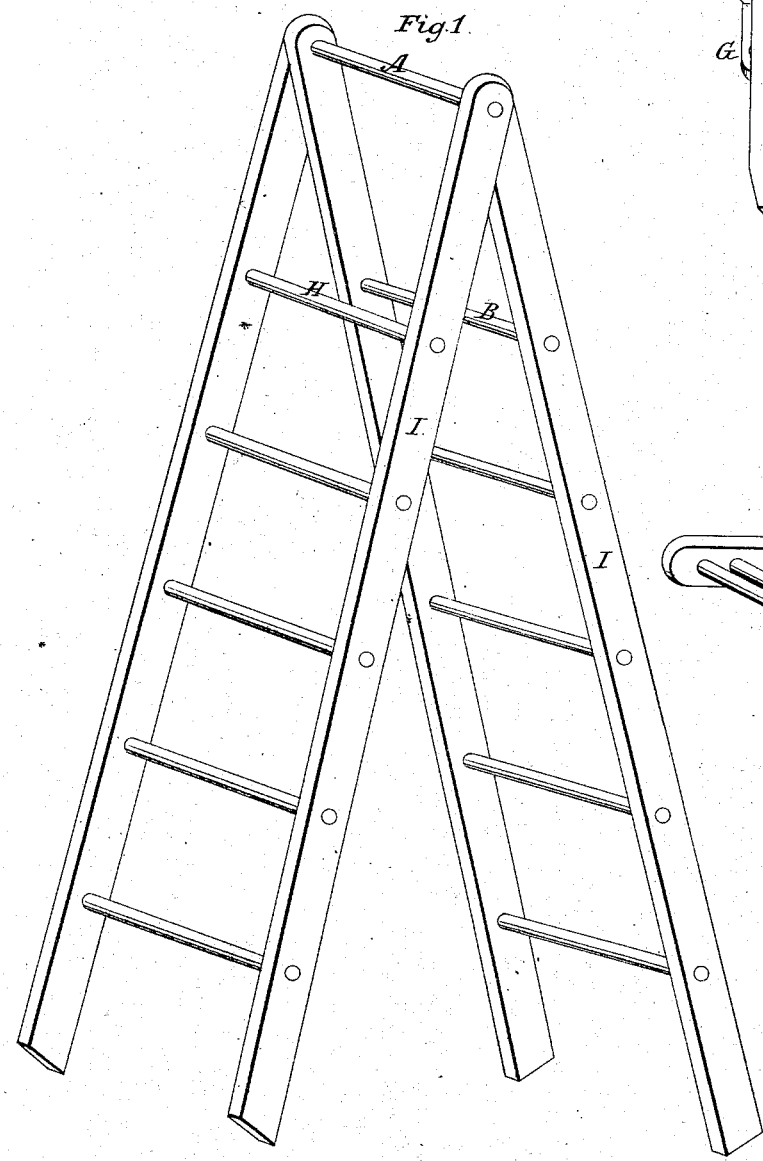
Figure 3:
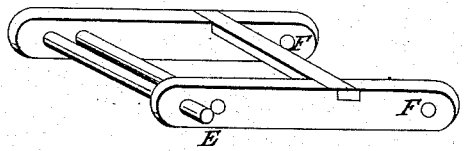

Figures 1, 2, and 3 represent a perspective view of the different parts of the arrangement.

Similar letters of reference where they occur in the separate figures denote like parts of the arrangement in all cases.

My invention consists of a self adjusting platform attached to a double ladder two ladders being connected at the top by a shaft or pivot on which they turn so as to be spread or contracted by which means they are raised and lowered to suit the convenience of the operator. The platform is attached in such a manner as to adjust itself to every position of the ladders remaining at all times in a proper position as will be described in connection with the drawings.

Fig. 1, represents two ladders, I, I, connected at the top by shaft, A, on which they turn and which allows them to be spread or contracted and by which means they are raised and lowered.

Fig. 3, represents one of the two frames which support the platform Fig. 2, and are connected to it by shaft, E, which passes through holes D, D, on one side and G, G, on the other. They are then connected to the ladders by shaft B, which passes through the holes F, F, and shaft H, which passes through corresponding holes in the opposite frame. The above named shafts are pivots which facilitate the spreading and contracting of the ladders. C, C, are slots connected with the platform Fig. 2 within which works shaft A, and serves to keep the platform in an upright position.

What I claim as my invention and desire to secure by Letters Patent is—

The combination of the self adjusting platform D, G, C, with the ladders I, I, and frame F, G, substantially as and for the purpose specified.

GEORGE ALDRICH.

In presence of—
H. O. SMITH,
DANIEL FLAGLER.